US010897732B2

(12) United States Patent
Sirotkin et al.

(10) Patent No.: US 10,897,732 B2
(45) Date of Patent: *Jan. 19, 2021

(54) APPARATUS, SYSTEM AND METHOD OF ACCESS NETWORK DISCOVERY AND SELECTION FUNCTION (ANDSF) FOR TRAFFIC OFFLOADING

(71) Applicant: APPLE INC., Cupertino, CA (US)

(72) Inventors: Alexander Sirotkin, Giv'on Hachadasha (IL); Vivek Gupta, San Jose, CA (US)

(73) Assignee: APPLE INC., Cupertino, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/864,352

(22) Filed: Jan. 8, 2018

(65) Prior Publication Data
US 2018/0132154 A1 May 10, 2018

Related U.S. Application Data

(63) Continuation of application No. 14/492,035, filed on Sep. 21, 2014, now Pat. No. 9,894,581.
(Continued)

(51) Int. Cl.
*H04W 36/22* (2009.01)
*H04W 48/14* (2009.01)
(Continued)

(52) U.S. Cl.
CPC .......... *H04W 36/22* (2013.01); *H04W 8/005* (2013.01); *H04W 28/08* (2013.01); *H04W 48/14* (2013.01);
(Continued)

(58) Field of Classification Search
CPC ..... H04W 36/22; H04W 28/08; H04W 48/14; H04W 8/005; H04W 4/02; H04W 4/50; H04W 88/06; H04W 48/18
See application file for complete search history.

(56) References Cited

U.S. PATENT DOCUMENTS 9,629,048 B2 * 4/2017 Jeong .............. H04W 36/26
9,820,219 B2 * 11/2017 Tsuboi ............. H04W 48/18
(Continued)

FOREIGN PATENT DOCUMENTS

CN 1100857 3/1995
CN 102238632 11/2011
(Continued)

OTHER PUBLICATIONS

Office Action for European Patent Application No. 15733263.6, dated Nov. 9, 2018, 7 pages.
(Continued)

*Primary Examiner* — Walter J Divito

(57) ABSTRACT

Some demonstrative embodiments include devices, systems and methods of Access Network Discovery and Selection Function (ANDSF) for traffic offloading. For example, an ANDSF Management Object (MO) may include one or more ANDSF policies, at least one ANDSF policy including ANDSF selection criteria to offload traffic between a cellular network and a Wireless Local Area Network (WLAN); and a preference indicator to indicate a preference between the ANDSF selection criteria and Radio Access Network (RAN) selection criteria from the cellular network.

25 Claims, 6 Drawing Sheets

Related U.S. Application Data

(60) Provisional application No. 61/924,194, filed on Jan. 6, 2014.

(51) Int. Cl.
    *H04W 28/08*     (2009.01)
    *H04W 8/00*     (2009.01)
    *H04W 48/18*     (2009.01)
    *H04W 88/06*     (2009.01)
    *H04W 4/50*     (2018.01)

(52) U.S. Cl.
    CPC .............. *H04W 4/50* (2018.02); *H04W 48/18* (2013.01); *H04W 88/06* (2013.01)

(56) References Cited

U.S. PATENT DOCUMENTS

| | | |
|---|---|---|
| 9,894,581 B2 | 2/2018 | Sirotkin et al. |
| 2007/0238466 A1 | 10/2007 | Buckley et al. |
| 2011/0170481 A1 | 7/2011 | Gomes et al. |
| 2011/0188376 A1 | 8/2011 | Stupar et al. |
| 2012/0257598 A1 | 10/2012 | Karampatsis et al. |
| 2013/0124738 A1 | 5/2013 | Lynch et al. |
| 2013/0142042 A1 | 6/2013 | Garcia Martin et al. |
| 2013/0170351 A1 | 7/2013 | Reznik et al. |
| 2014/0029420 A1* | 1/2014 | Jeong ................. H04L 12/5692 370/229 |
| 2014/0161026 A1 | 6/2014 | Stojanovski et al. |
| 2014/0233386 A1* | 8/2014 | Jamadagni ............ H04W 36/22 370/235 |
| 2014/0241333 A1 | 8/2014 | Kim et al. |
| 2014/0295843 A1* | 10/2014 | Van Der Velde ..... H04W 36/22 455/436 |
| 2015/0195759 A1 | 7/2015 | Sirotkin et al. |
| 2016/0029295 A1 | 1/2016 | Nagasaka et al. |
| 2016/0073450 A1 | 3/2016 | Vikberg et al. |
| 2016/0165428 A1 | 6/2016 | Lee et al. |
| 2016/0192252 A1* | 6/2016 | Dai ................... H04W 36/0094 370/331 |

FOREIGN PATENT DOCUMENTS

| | | |
|---|---|---|
| CN | 103181212 | 6/2013 |
| CN | 103338483 | 10/2013 |
| CN | 103385016 | 11/2013 |
| JP | 2012200002 | 10/2012 |
| JP | 2013516930 | 5/2013 |
| JP | 2013517708 | 5/2013 |
| WO | 2012135467 | 10/2012 |

OTHER PUBLICATIONS

Office Action for European Patent Application No. 15733263.6, dated Feb. 2, 2018, 6 pages.
3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013; 209 pages.
3GPP TS 36.331 V11.5.0 (Sep. 2013); Technical Specification; 3rd Generation Partnership Project; Technical Specification Group Radio Access Network; Evolved Universal Terrestrial Radio Access (E-UTRA); Radio Resource Control (RRC); Protocol specification (Release 11); Sep. 2013; 347 pages.
3GPP TS 24.302 V12.3.0 (Dec. 2013); Technical Specification; 3rd Generation Partnership Project; Technical Specification Group Core Network and Terminals; Access to the 3GPP Evolved Packet Core (EPC) via non-3GPP access networks; Stage 3 (Release 12); Dec. 2013; 83 pages.
3GPP TS 25.331 V11.7.0 (Sep. 2013); Technical Specification; 3rd Generation Partnership Project; Technical Specification Group Radio Access Network; Radio Resource Control (RRC); Protocol specification (Release 11); Sep. 2013; 2086 pages.
3GPP TS 25.304 V11.4.0 (Sep. 2013); Technical Specification; 3rd Generation Partnership Project; Technical Specification Group Radio Access Network; User Equipment (UE) procedures in idle mode and procedures for cell reselection in connected mode (Release 11); Sep. 2013; 54 pages.
3GPP TS 23.402 V12.3.0 (Dec. 2013); Technical Specification; 3rd Generation Partnership Project; Technical Specification Group Services and System Aspects; Architecture enhancements for non-3GPP accesses (Release 12); Dec. 2013; 288 pages.
3GPP TS 24.312 V12.3.0 (Dec. 2013); Technical Specification; 3rd Generation Partnership Project; Technical Specification Group Core Network and Terminals; Access Network Discovery and Selection Function (ANDSF) Management Object (MO) (Release 12); Dec. 2013; 249 pages.
S2-142165; (revision of S2-141744, 1962, 1982); SA WG2 Meeting #103; May 19-23, 2014, Phoenix, AZ, USA; "Usage of RAN assistance parameters in ANDSF rules"; 7 pages.
C1-143398; (was C1-143366); 3GPP TSG-CT WG1 Meeting #88; Cape Town, South Africa, Jul. 14-18, 2014; "ANDSF MO for RAN assistance information"; 40 pages.
International Search Report and Written Opinion for International Application No. PCT/US2015010298, dated Apr. 2, 2015, 8 pages.
Office Action for U.S. Appl. No. 14/492,035, dated Apr. 22, 2016, 26 pages.
Office Action for U.S. Appl. No. 14/492,035, dated Sep. 2, 2016, 17 pages.
International Preliminary Report on Patentability for PCT/US2015/010298, dated Jul. 21, 2016, 7 pages.
Office Action for U.S. Appl. No. 14/492,035, dated Apr. 12, 2017, 17 pages.
Office Action for Korean Patent Application No. 2016-7015007, dated Feb. 20, 2017, 9 pages (Including 4 pages of English translation).
Advisory Action for U.S. Appl. No. 14/492,035, dated Dec. 28, 2016, 8 pages.
Notice of Allowance for U.S. Appl. No. 14/492,035, dated Oct. 4, 2017, 16 pages.
European Search Report for European Patent Application No. 15733263.6 dated May 10, 2017, 8 pages.
"3rd Generation Partnership Project; Technical Specification Group, Radio Access Network; Study on WLAN/3GPP radio interworking (Release 12)" Dec. 29, 2013, 19 pages.
LG Electronics INC et al: "Text proposal on WLAN3GPP radio interworking solution 2",3GPP Draft; DRAFT_R2-132193 TP Des Lucioles ; May 24, 2013, 3 pages.
Office Action for U.S. Appl. No. 14/492,035, dated Aug. 8, 2017, 28 pages.
Office Action for Japanese Patent Application No. 2016-543700, dated Aug. 15, 2017, 6 pages (Including 3 pages of English translation).
Presentation of Specification to TSG, 3GPP TSG-RAN#62 RP-131712, Nov. 26, 2013, 21 pages.
Motorola Moblilty et al.,Update ANDSF information to support WLAN access network selection and WORM, 3GPP TS G-SA WG2#100 S2-134301, Nov. 15, 2013, 13 pages.
Motorola Mobility et al., UE procedures based on ANDSF information, 3GPP TSG-SA WG2#100 S2-134302, Nov. 15, 2013, 8 pages.
Office Action for European Patent Application No. 15733263.6, dated Apr. 9, 2019, 6 pages.
Office Action for Chinese Patent Application No. 201580002934.1, dated Oct. 8, 2018, 7 pages.
NSN, Nokia Corporation, Deutsche Telekom ; "(Compromising) WLAN IW Solution for UEs with and without ANDSF"; 3GPP TSG-RAN WG2 Meeting #83, R2-132327; Aug. 2013; 5 pages.
Office Action for Japanese Patent Application No. 2016-543700, dated Jan. 8, 2019, 4 pages.

(56) References Cited

OTHER PUBLICATIONS

Office Action for Japanese Patent Application No. 2016-543700, dated Apr. 24, 2018, 6 pages (Including 3 pages of English translation).

* cited by examiner

APPARATUS, SYSTEM AND METHOD OF ACCESS NETWORK DISCOVERY AND SELECTION FUNCTION (ANDSF) FOR TRAFFIC OFFLOADING

CROSS REFERENCE

This Application claims the benefit of and priority from U.S. Provisional Patent Application No. 61/924,194 entitled "Advanced Wireless Communication Systems and Techniques", filed Jan. 6, 2014, the entire disclosure of which is incorporated herein by reference.

TECHNICAL FIELD

Some embodiments described herein generally relate to traffic Access Network Discovery and Selection Function (ANDSF) for traffic offloading.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

There exists a need for solutions to enhance a level of cooperation and/or integration between WLAN and cellular networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
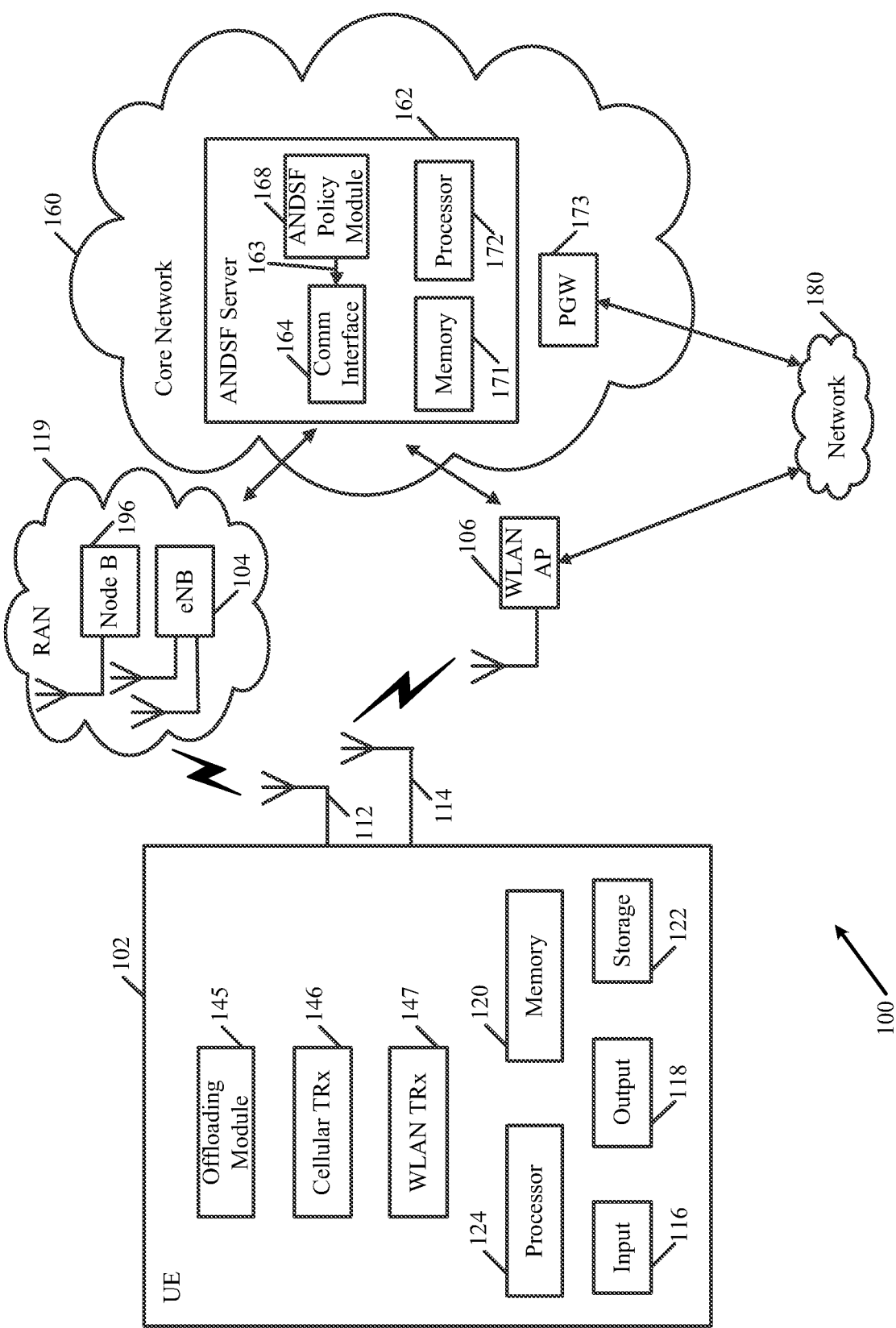
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.300 (3*GPP TS* 36.300 *V*11.7.0 (2013-09);

Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)); 3GPP TS 36.331 (3*GPP TS* 36.331 *V*11.5.0 (2013-09); *Technical Specification; 3rd Generation Partnership Project; Technical Specification Group Radio Access Network; Evolved Universal Terrestrial Radio Access (E-UTRA); Radio Resource Control (RRC); Protocol specification (Release* 11)); 3GPP TS 24.302 (3*GPP TS* 24.302 *V*12.3.0 (2013-12); *Technical Specification; 3rd Generation Partnership Project; Technical Specification Group Core Network and Terminals; Access to the 3GPP Evolved Packet Core (EPC) via non-3GPP access networks; Stage 3 (Release* 12)); 3*GPP* 25.331 (3*GPP TS* 25.331 *V*11.7.0 (2013-09); *Technical Specification; 3rd Generation Partnership Project; Technical Specification Group Radio Access Network; Radio Resource Control (RRC); Protocol specification (Release* 11)); 3GPP TS 25.304 (3*GPP TS* 25.304 *V*11.4.0 (2013-09); *Technical Specification; 3rd Generation Partnership Project; Technical Specification Group Radio Access Network; User Equipment (UE) procedures in idle mode and procedures for cell reselection in connected mode (Release* 11)); 3GPP TS 23.402 (3*GPP TS* 23.402 *V*12.3.0 (2013-12); *Technical Specification; 3rd Generation Partnership Project; Technical Specification Group Services and System Aspects; Architecture enhancements for non-*3*GPP accesses (Release* 12)); and 3GPP TS 24.312 (3*GPP TS* 24.312 *V*12.3.0 (2013-12); *Technical Specification; 3rd Generation Partnership Project; Technical Specification Group Core Network and Terminals; Access Network Discovery and Selection Function (ANDSF) Management Object (MO) (Release* 12))), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, LTE Unlicensed systems, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums, for example, a radio channel, a cellular channel, an RF channel, a Wireless Fidelity (WiFi) channel, an IR channel, and the like, e.g., as described below. One or more elements of system 100 may optionally be capable of communicating over any suitable wired communication links.

In some demonstrative embodiments, system 100 may include at least one User Equipment (UE) 102 capable of communicating with one or more wired networks 180 via at least one Radio Access Network (RAN) 119, and/or via at least one non-cellular network, e.g., as described below.

In some demonstrative embodiments, UE 102 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, networks 180 may include one or more Packet Data Networks (PDNs). For example, networks 180 may include an Internet network, an IP Multimedia Core Network Subsystem (IMS) network, and/or any other PDN. In other embodiments, networks 180 may include any other suitable additional and/or alternative network.

In some demonstrative embodiments, RAN 119 may include one or more cells controlled by one or more cellular nodes ("nodes"). For example, RAN 119 may include an evolved Node B (eNB) 104, a Node B 196, and/or any other cellular node, e.g., a Base Station (BS), a Base Transceiver Station (BTS), and the like.

In some demonstrative embodiments, eNB 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In some demonstrative embodiments, system 100 may include a non-cellular network, for example, a WLAN, e.g., a Basic Service Set (BSS), managed by an Access Point (AP) 106.

In some demonstrative embodiments, the non-cellular network may at least partially be within a coverage area of RAN 119. For example, AP 106 may be within a coverage area of eNB 104.

In some demonstrative embodiments, system 100 may also include a Core Network (CN or CNW) 160, which may be configured to provide one or more services to UE 102, and/or to setup and/or manage communication between UE 102 and RAN 119 and/or networks 180, e.g., as described below.

In some demonstrative embodiments, CN 160 may include one or more PDN Gateways (PGWs) 173 to support a PDN connection between UE 102 and a PDN of network 180.

In some demonstrative embodiments, a PGW 173 may be associated with an Access Point Name (APN). UE 102 may utilize the APN of a PGW 173, for example, to facilitate a connection to network 180 via the PGW 173.

In some demonstrative embodiments, core network 160 may include an Access Network Discovery and Selection Function (ANDSF) server 162, which may be configured to assist UE 102 in steering traffic between Radio Access Technology (RAT) networks, for example, between RAN 119 and WLAN AP 106, e.g., as described below.

In some demonstrative embodiments, ANDSF server 162 may include an ANDSF policy module 168 to determine one or more ANDSF Management Objects (MOs) 163 including one or more ANDSF policies, e.g., as described below.

In some demonstrative embodiments, ANDSF policy module 168 may include or may be implemented using suitable circuitry, e.g., controller circuitry, processor circuitry, memory circuitry, and/or any other circuitry, which may be configured to perform at least part of the functionality of module 168. Additionally or alternatively, one or more functionalities of module 168 may be implemented by logic, which may be executed by a machine and/or one or more processors, e.g., as described below.

In some demonstrative embodiments, ANDSF server 162 may include one or more interfaces to interface between ANDSF server 162 and one or more other elements of system 100, e.g., as described below.

In some demonstrative embodiments, ANDSF server 162 may include a communication interface 164 to communicate the one or more ANDSF MOs 163 to UE 102. For example, interface 164 may communicate the ANDSF MOs 163 via RAN 119 and/or via WLAN AP 106. In one example, interface 164 may include an S14 interface to communicate with UE 102 via as S14 reference point, or any other interface.

In some demonstrative embodiments, UE 102, eNB 104, AP 106, and/or Node B 196 may include one or more wireless communication units to perform wireless communication between UE 102, RAN 119, AP 106 and/or with one or more other wireless communication devices, e.g., as described below.

In some demonstrative embodiments, UE 102 may include a cellular Transceiver (TRx) 146 to communicate with RAN 119, and a WLAN TRx 147 to communicate with AP 106.

In some demonstrative embodiments, cellular TRx 146 and/or WLAN TRx 147 may include, or may be associated with, one or more antennas. In one example, UE 102 may include at least two antennas, e.g., antennas 112 and 114, or any other number of antennas, e.g., one antenna or more than two antennas.

In some demonstrative embodiments, antennas 112, and/or 114 may include any type of antennas suitable for transmitting and/or receiving wireless communication signals, blocks, frames, transmission streams, packets, messages and/or data. For example, antennas 112 and/or 114 may include any suitable configuration, structure and/or arrangement of one or more antenna elements, components, units, assemblies and/or arrays. For example, antennas 112 and/or 114 may include a phased array antenna, a dipole antenna, a single element antenna, a set of switched beam antennas, and/or the like.

In some embodiments, antennas 112 and/or 114 may implement transmit and receive functionalities using separate transmit and receive antenna elements. In some embodiments, antennas 112 and/or 114 may implement transmit and receive functionalities using common and/or integrated transmit/receive elements.

In some demonstrative embodiments, cellular TRx 146 and/or WLAN TRx 147 may include one or more wireless transmitters, receivers and/or transceivers able to send and/or receive wireless communication signals, RF signals, frames, blocks, transmission streams, packets, messages, data items, and/or data.

In some demonstrative embodiments, WLAN TRx 147 may be configured to communicate with AP 106 over a WLAN link, and cellular transceiver 146 may be configured to communicate with RAN 119 over a cellular link.

In some demonstrative embodiments, the WLAN link may include, for example, a Wireless Fidelity (WiFi) link, a Wireless Gigabit (WiGig) link, or any other link. In some demonstrative embodiments, the WLAN link may include, for example, a link over the 2.4 Gigahertz (GHz) or 5 GHz frequency band, the 60 GHz frequency band, or any other frequency band.

In some demonstrative embodiments, cellular TRx 146 may include a multiple input multiple output (MIMO) transmitters receivers system (not shown), which may be capable of performing antenna beamforming methods, if desired. In other embodiments, cellular TRx 146 may include any other transmitters and/or receivers.

In some demonstrative embodiments, cellular TRx 146 may include a turbo decoder and/or a turbo encoder (not shown) for encoding and/or decoding data bits into data symbols, if desired. In other embodiments, cellular TRx 146 may include any other encoder and/or decode.

In some demonstrative embodiments, cellular TRx 146 may include OFDM and/or SC-FDMA modulators and/or demodulators (not shown) configured to communicate OFDM signals over downlink channels, e.g., between RAN 119 and UE 102, and SC-FDMA signals over uplink channels, e.g., between UE 102 and RAN 119. In other embodiments, cellular TRx 146 may include any other modulators and/or demodulators.

In some demonstrative embodiments, WLAN TRx 147 may establish a WLAN link with AP 106. For example, WLAN TRx 147 may perform the functionality of one or more STAs, e.g., one or more WiFi STAs, WLAN STAs, and/or millimeter Wave (mmWave) STAs. The WLAN link may include an uplink and/or a downlink. The WLAN downlink may include, for example, a unidirectional link from AP 106 to the one or more STAs. The uplink may include, for example, a unidirectional link from a STA to AP 106.

In some demonstrative embodiments, UE 102 may also include, for example, one or more of a processor 124, an input unit 116, an output unit 118, a memory unit 120, and a storage unit 122. UE 102 may optionally include other suitable hardware components and/or software components. In some demonstrative embodiments, some or all of the components of UE 102 may be enclosed in a common housing or packaging, and may be interconnected or operably associated using one or more wired or wireless links.

In some demonstrative embodiments, ANDSF server 162 may also include, for example, a processor 172 and/or a memory unit 171. ANDSF server 162 may optionally include other suitable hardware components and/or software components. In some demonstrative embodiments, some or all of the components of ANDSF server 162 may be enclosed in a common housing or packaging, and may be interconnected or operably associated using one or more wired or wireless links. In other embodiments, components of MME 162 may be distributed among multiple or separate devices.

Processor 124 and/or processor 172 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 124 executes instructions, for example, of an Operating System (OS) of UE 102 and/or of one or more suitable applications. Processor 172 executes instructions, for example, of an Operating System (OS) of ANDSF server 162 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102. Memory unit 171 may store, for example, data processed by ANDSF server 162.

In some demonstrative embodiments, UE 102 may be configured to utilize a cellular connection, e.g., a Long Term Evolution (LTE) cellular connection, a Universal Mobile Telecommunications System (UMTS) connection or any other cellular connection, to communicate with RAN 119, and a WLAN connection, e.g., a Wireless-Fidelity (WiFi) connection or any other WLAN connection, to communicate with AP 106.

In some demonstrative embodiments, cellular TRx 146 utilize the cellular link between UE 102 and RAN 119 to communicate traffic of one or more PDN connections, e.g., via one or more PGWs 173.

In some demonstrative embodiments, UE 102 may establish one or more bearers, e.g., one or more Evolved Packet-switched System (EPS) bearers, via the one or more PDN connections between UE 102 and one or more PGWs 173.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, utilizing the WLAN connection as a default connection, e.g., as long as UE 102 receives from AP 106 a strong enough signal, may result in an increase in the congestion of the WLAN, e.g., if a large number of UEs simultaneously connect to the same AP, which in turn may result in a decrease of throughput over the WLAN connection between UE 102 and AP 106.

In some demonstrative embodiments, system 100 may be configured to enable selective connection of UE 102 to network 180 via the WLAN or RAN 119, for example, based on one or more criteria and/or parameters, e.g., as described in detail below.

In some demonstrative embodiments, the selective connection between UE 102 and network 180 via RAN 119 and/or via AP 106 may enable, for example, load balancing between the WLAN and the cellular network.

In some demonstrative embodiments, UE 102 may be configured to facilitate a UE-centric (also referred to as "UE controlled") access network selection scheme, in which UE 102 may select an access network to be utilized by UE 102.

In some demonstrative embodiments, UE 102 may include an offloading module 145 to control one or more traffic offloading functionalities of UE, for example, to steer traffic between the WLAN and RAN 119, e.g., as described below.

In some demonstrative embodiments, offloading module 145 may include or may be implemented using suitable circuitry, e.g., controller circuitry, processor circuitry, memory circuitry, and/or any other circuitry, which may be configured to perform at least part of the functionality of offloading module 145. Additionally or alternatively, one or more functionalities of offloading module 145 may be implemented by logic, which may be executed by a machine and/or one or more processors, e.g., as described below.

In some demonstrative embodiments, controller 145 may make a traffic steering decision, for example, to steer traffic from a PDN connection, e.g., via RAN 119, to a WLAN connection, e.g., via WLAN AP 106, and/or from the WLAN connection back to the PDN connection, for example, based on selection criteria ("the RAN selection criteria") provided by RAN 119, and/or based on selection criteria ("the ANDSF selection criteria") provided by ANDSF server 162, e.g., as described below.

In some demonstrative embodiments, RAN 119 may provide the RAN selection criteria to UE 102. For example, cellular TRx 146 may receive the RAN assistance information via Radio Resource Control (RRC) signaling, e.g., from eNB 104, and/or via any other message.

In some demonstrative embodiments, the RAN selection criteria may include, or may be included as part of, assistance information ("the RAN assistance information"). In some demonstrative embodiments, the RAN selection criteria may include one or more RAN assistance parameters, and/or one or more selection rules ("RAN rules") corresponding to the RAN assistance parameters.

In some demonstrative embodiments, ANDSF server 162 may provide the ANDSF selection criteria to UE 102. For example, communication interface 164 may send to UE an ANDSF MO 163 including the ANDSF selection criteria, e.g., as described below. UE 102 may receive the ANDSF MO including the ANDSF selection criteria, for example, via RAN 119, e.g., via cellular TRx 146, and/or via the WLAN, e.g., via WLAN TRx 147.

In some demonstrative embodiments, the ANDSF selection criteria may include, or may be included as part of, assistance information ("the ANDSF assistance information"). In some demonstrative embodiments, the ANDSF selection criteria may include one or more ANDSF assistance parameters, and/or one or more selection rules ("ANDSF rules") corresponding to the ANDSF assistance parameters, e.g., as described below.

In some demonstrative embodiments, ANDSF policy module 168 may determine an ANDSF MO 163 including one or more ANDSF policies corresponding to UE 102. The ANDSF policies may include the ANDSF assistance information and one or more ANDSF rules configured to select between RAN 119 and WLAN AP 106, e.g., as described below.

In some demonstrative embodiments, the ANDSF assistance parameters may include, for example, offload preference information. For example, the offload preference information may include an offload preference indication to indicate, for example, a preference between accessing network 180 via cellular access, e.g., via RAN 119, or via WLAN access, e.g., via WLAN AP 106. The offload preference information may be based, for example, on a cellular load of RAN 119, and/or based on operator load balancing and/or traffic offloading preferences. The offload preference information may indicate, for example, how "aggressive" the operator may allow UE 102 to use offloading to the WLAN.

In some demonstrative embodiments, the ANDSF assistance parameters may include, for example, one or more signal strength thresholds, e.g., as described below.

In some demonstrative embodiments, the ANDSF assistance parameters may include, for example, one or more cellular thresholds, e.g., including a Reference Signal Received Power (RSRP) threshold, a Received Signal Code Power (RSCP) threshold, and/or any other threshold related to RAN 119.

In some demonstrative embodiments, the ANDSF assistance parameters may include, for example, one or more WLAN thresholds, for example, one or more WLAN signal strength thresholds, e.g., one or more Received Signal Strength Indicator (RSSI) thresholds, one or more WLAN load thresholds, e.g., a BSS load threshold, backhaul bandwidth thresholds, one or more WLAN metrics, e.g., available bandwidth and/or available throughput, and the like.

In some demonstrative embodiments, the ANDSF assistance parameters may include any other additional or alternative threshold, parameter and/or assistance information corresponding to RAN 119 and/or the WLAN.

In some demonstrative embodiments, the ANDSF rules may include one or more rules to enable UE 102 to select to offload traffic to the WLAN or RAN 119, for example, based on the ANDSF assistance parameters, e.g., based on a comparison between one or more signal strengths and the signal strength thresholds.

In some demonstrative embodiments, ANDSF server 162 may determine the ANDSF assistance information based on a status of RAN 119, e.g., based on a load of RAN 119, and/or any other parameter of RAN 119.

In some demonstrative embodiments, ANDSF policy module 168 may determine one or more policies including the ANDSF assistance information and/or the ANDSF rules, for example, an Inter-System Routing Policy (ISRP), a Wireless Local Area Network (WLAN) Selection policy (WLANSP), and/or an Inter System Mobility Policy (ISMP), e.g., as described below.

In some demonstrative embodiments, ANDSF policy module 168 may generate at least one ANDSF MO 163 including the one or more policies, and communication interface 164 may send the ANDSF MO 163 to UE 102.

In some demonstrative embodiments, WLAN policy module 168 may determine the ANDSF MO 163 to include at least one node, e.g., a policy node, including the offload preference indication, e.g., to indicate preference between RAN 119 and the WLAN.

In some demonstrative embodiments, WLAN policy module 168 may determine the ANDSF MO 163 to include at least one node, e.g., a policy node, including one or more thresholds. The policy node may determine validity conditions, for example, based on RAN assistance parameters or WLAN assistance parameters, e.g., as described above.

In one example, the ANDSF MO 163 may include a policy node including one or more WLAN thresholds ("the ANDSF WLAN thresholds"). The ANDSF WLAN thresholds may include, for example, one or more WLAN signal strength thresholds, a BSS load threshold, and/or any other threshold corresponding to WLAN AP 106.

In another example, the ANDSF MO 163 may include a policy node including one or more cellular thresholds ("the ANDSF cellular thresholds"). The ANDSF cellular thresholds may include, for example, one or more cellular signal strength thresholds, e.g., an RSRP threshold, an RSCP threshold, and/or any other threshold corresponding to RAN 119.

In some demonstrative embodiments, providing the ANDSF assistance information to UE 102 via the ANDSF MO may enable, for example, efficient and/or improved load balancing between RAN 119 and the WLAN, and/or increased Quality of Experience (QoE) of a user of UE 102, e.g., when using both RAN 119 and the WLAN.

In some demonstrative embodiments, an operator of CN 160 may utilize the ANDSF MO 163 to apply different traffic steering policies, for example, based on conditions of RAN 119. In one example, the operator may control ANDSF server 162 to provide UE 102 with ANDSF MO 163 configured, e.g., with an offload preference indicator, to prefer a first WLAN network, e.g., if eNB 104 is highly overloaded, and to prefer a second WLAN network, e.g., if eNB 104 is not loaded. Additionally or alternatively, the operator may apply different policies to UEs 102 in cell center or cell edge, for example, by adjusting one or more of the signal strength thresholds. In one example, the operator may prefer one or more first WLAN networks for UEs having a strong cellular signal, e.g., cell center UEs, and one or more second WLAN networks for UEs having a weak cellular signal, e.g., cell edge UEs.

In some demonstrative embodiments, ANDSF server 162 may be configured to indicate to UE 102 a preference between the ANDSF selection criteria and the RAN selection criteria, for example, to enable coexistence of the ANDSF selection criteria and the RAN selection criteria, and/or to resolve potential conflict between the RAN selection criteria and the ANDSF selection criteria, e.g., when UE 102 receives both the RAN selection criteria and the ANDSF selection criteria.

In one example, ANDSF server 162 may be configured to indicate to UE 102 a preference between the ANDSF rules and the RAN rules, e.g., to resolve potential conflict when both ANDSF and RAN rules are deployed by the operator of CN 160.

In some demonstrative embodiments, ANDSF policy module 168 may include in ANDSF MO 163 a preference indicator to indicate a preference between the RAN selection criteria provided by RAN 119 and the ANDSF selection criteria provided by ANDSF server 162.

In some demonstrative embodiments, the preference indicator may be configured to indicate a preference between RAN policies defined by RAN 119 and ANDSF policies defined by ANDSF server 162, to indicate a preference between RAN rules defined by RAN 119 and ANDSF rules defined by ANDSF server 162, to indicate a preference between RAN thresholds defined by RAN 119 and ANDSF thresholds defined by ANDSF server 162, to indicate a preference between RAN assistance parameters defined by RAN 119 and ANDSF assistance parameters defined by ANDSF server 162, and/or to indicate a preference between any RAN selection criteria defined by RAN 119 and ANDSF selection criteria defined by ANDSF server 162.

In some demonstrative embodiments, the preference indicator may have a first value, e.g., "0", to indicate the ANDSF selection criteria is to be preferred, or a second value, e.g., "1", to indicate the RAN selection criteria is to be preferred.

In some demonstrative embodiments, the preference indicator may be included as part of a sub-object and/or a preference node in the ANDSF MO, e.g., as described below.

In some demonstrative embodiments, the ANDSF MO 163 may include a preference flag, e.g., as indicated below.

In other embodiments, the preference indicator may be implemented as part of any other field, element, value and/or node of the ANDSF MO 163, or in any other manner. In one example, the preference indicator may be included in a Universal Subscriber Identity (USIM) or on a Mobile Equipment (ME).

In some demonstrative embodiments, offloading module 145 may receive the ANDSF MO 163 from ANDSF server 162, e.g., via the core network, via RAN 119, and/or via WLAN AP 106.

In some demonstrative embodiments, offloading module 145 may receive the ANDSF selection criteria, e.g., from ANDSF server, and the RAN selection criteria, e.g., from RAN 119.

In some demonstrative embodiments, the ANDSF MO 163 may include the preference indicator to indicate the preferred selection criteria are to be either the RAN selection criteria or the ANDSF selection criteria.

In some demonstrative embodiments, offloading module 145 may offload traffic of UE 102 between WLAN AP 106 and RAN 119, for example, based on the preferred selection criteria, e.g., the ANDSF selection criteria or the RAN selection criteria, indicated by the ANDSF MO 163.

In some demonstrative embodiments, offloading module 145 may receive RAN WLAN thresholds, e.g., defined by RAN 119, and ANDSF WLAN thresholds, e.g., as defined by ANDSF server 162.

In some demonstrative embodiments, offloading module 145 may select to use the RAN WLAN thresholds, for example, when the preference indicator indicates that the RAN selection criteria are preferred.

In some demonstrative embodiments, offloading module 145 may select to use the ANDSF WLAN thresholds, for example, when the preference indicator indicates that the ANDSF selection criteria are preferred.

In some demonstrative embodiments, the ANDSF MO 163 may include the offload preference indication to indicate between the cellular network and the WLAN, e.g., as described above. According to these embodiments, offloading module 145 may select to offload the traffic of UE 102, e.g., based on the offload preference indication.

Figure 2:
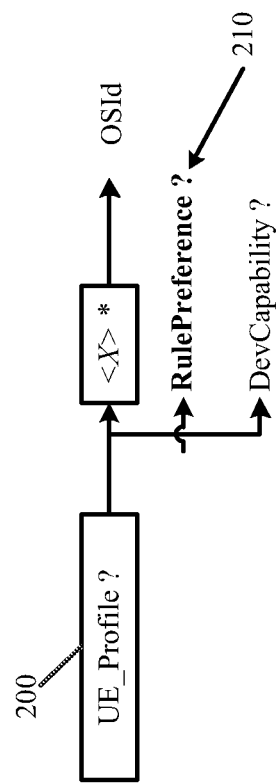
FIG. 2 is a schematic illustration of a user-profile node sub-object of an Access Network Discovery and Selection Function (ANDSF) Management Object (MO), in accordance with some demonstrative embodiments.

FIG. 2 is a schematic illustration of a user-profile node sub-object 200 of an ANDSF MO, in accordance with some demonstrative embodiments. For example, user-profile node sub-object 200 may be included as part of ANDSF MO 163 (FIG. 1).

In some demonstrative embodiments, user-profile node sub-object 200 may include a preference node ("RulePreference") 210 to indicate a preference between the RAN selection criteria and the ANDSF selection criteria.

In some demonstrative embodiments, the preference node 210 may have a first value, e.g., "0", to indicate ANDSF rules, e.g., one or more ANDSF WLAN thresholds, are to be preferred, or a second value, e.g., "1", to indicate RAN rules, e.g., one or more RAN WLAN thresholds, are to be preferred.

Figure 3:
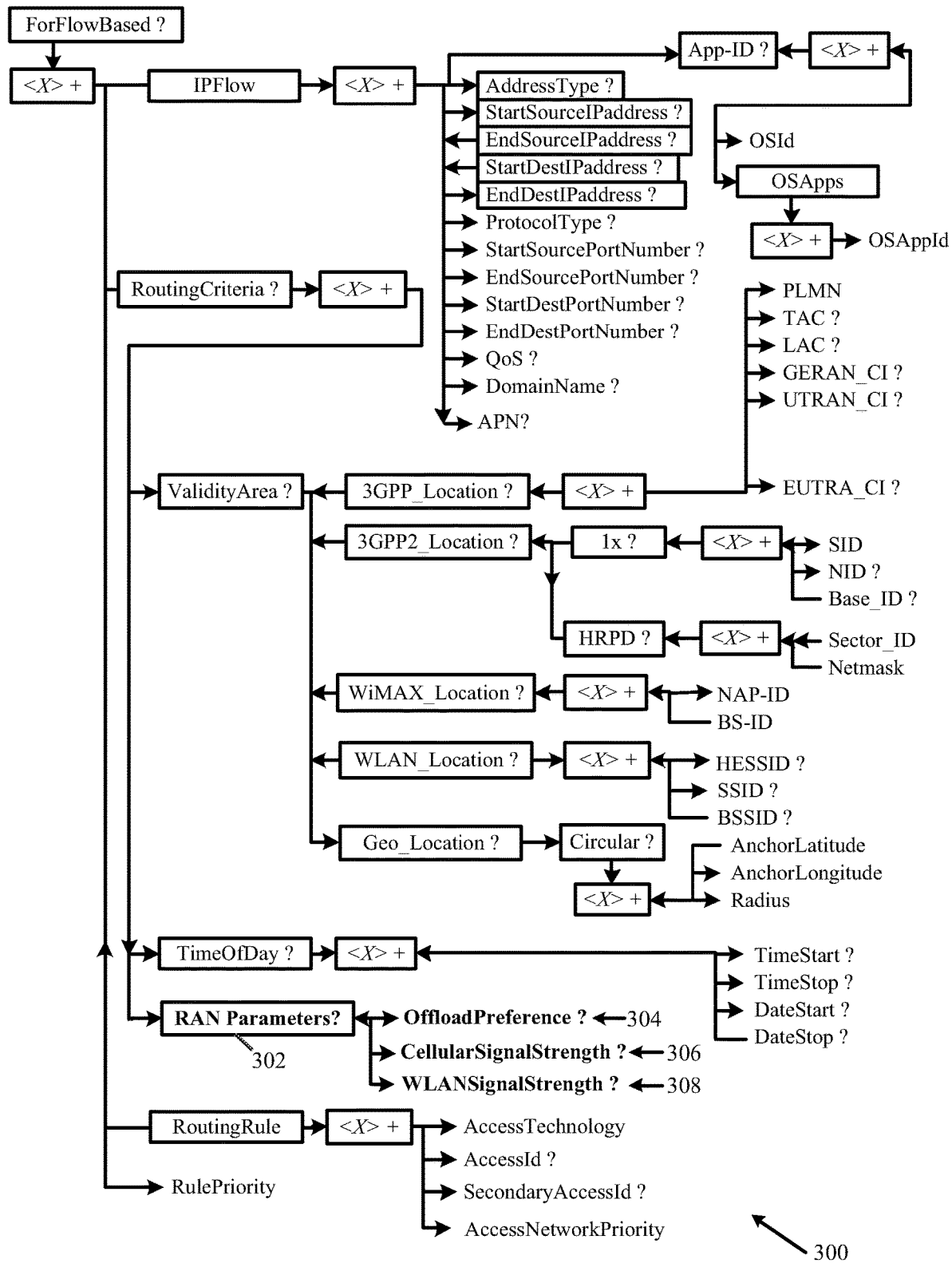
FIG. 3 is a schematic illustration of an Inter-System Routing Policy (ISRP) node of an ANDSF MO, in accordance with some demonstrative embodiments.

FIG. 3 is a schematic illustration of an Inter-System Routing Policy (ISRP) node 300 of an ANDSF MO, in accordance with some demonstrative embodiments. For example, ANDSF server 162 (FIG. 1) may send to UE 102 (FIG. 1) the ANDSF MO 163 (FIG. 1) including ISRP node 300.

In some demonstrative embodiments, ISRP node 300 may include ANDSF assistance information and/or ANDSF rules, e.g., as described below.

In some demonstrative embodiments, ISRP node 300 may include a branch ("RANParameters") 302 to include RAN parameters, e.g., the ANDSF assistance parameters, to be provided to a UE, e.g., to UE 102 (FIG. 1).

In some demonstrative embodiments, branch 302 may act as a placeholder for RAN parameter conditions for a particular rule, e.g., for ForFlowbased nodes and/or for ForNonSeamlessOffload nodes. In one example, branch 302 may be defined, e.g., as follows:

<X>/Policy/<X>/RANParameters

The RANParameters node acts as a placeholder for RAN parameters conditions for a particular rule.
Occurrence: ZeroOrOne
Format: node
Access Types: Get, Replace
Values: N/A In some demonstrative embodiments, branch 302 may include an offload preference indicator ("OffloadPreference") node 304 to indicate whether WLAN access or cellular access is preferred. For example, node 304 may include the offload preference indicator, e.g., as described above. In one example, node 304 may be defined, e.g., as follows:

<X>/Policy/<X>/RANParameters/Offload_Preference

The Offload_Preference node acts as a placeholder for 3GPP to WLAN offload preference threshold.
Occurrence: ZeroOrOne
Format: node
Access Types: Get, Replace
Values: N/A
OffloadPreference indicates whether the 3GPP access or WLAN access is preferred based on the load on the 3GPP radio access network and possibly other parameters or operator preferences.

In some demonstrative embodiments, branch 302 may include a cellular threshold ("CellularSignalStrengh") node 306 to indicate one or more cellular thresholds. For example, node 306 may include the ANDSF cellular thresholds, e.g., as described above. In one example, node 306 may be defined, e.g., as follows:

<X>/Policy/<X>/RANParameters/Cellular_Signal_Strength_Threshold

The Cellular_Signal_Strength_Threshold node acts as a placeholder for cellular signal strength threshold, e.g., RSRP or RSCP threshold.
Occurrence: ZeroOrOne
Format: node
Access Types: Get, Replace
Values: N/A
If the cellular signal strength as measured by UE is higher than the threshold provided in this node the UE shall prefer the 3GPPaccess for connecting to EPC.
NOTE: the value provide in this node is a default value, it can be overridden by a new (cell specific) threshold provided by the RAN.

In some demonstrative embodiments, branch 302 may include a cellular threshold ("WLANSignalStrength") node 308 to indicate one or more WLAN thresholds. For example, node 308 may include the ANDSF WLAN thresholds, e.g., as described above. In one example, node 308 may be defined, e.g., as follows:

<X>/Policy/<X>/RANParameters/WLAN_Signal_Strength_Threshold

The WLAN_Signal_Strength_Threshold node acts as a placeholder for WLAN signal strength threshold, e.g. RSSI threshold.
Occurrence: ZeroOrOne
Format: node
Access Types: Get, Replace
Values: N/A If the signal strength as measured by UE is higher than the threshold provided in this node the UE shall consider the corresponding rule as valid.

Figure 4:
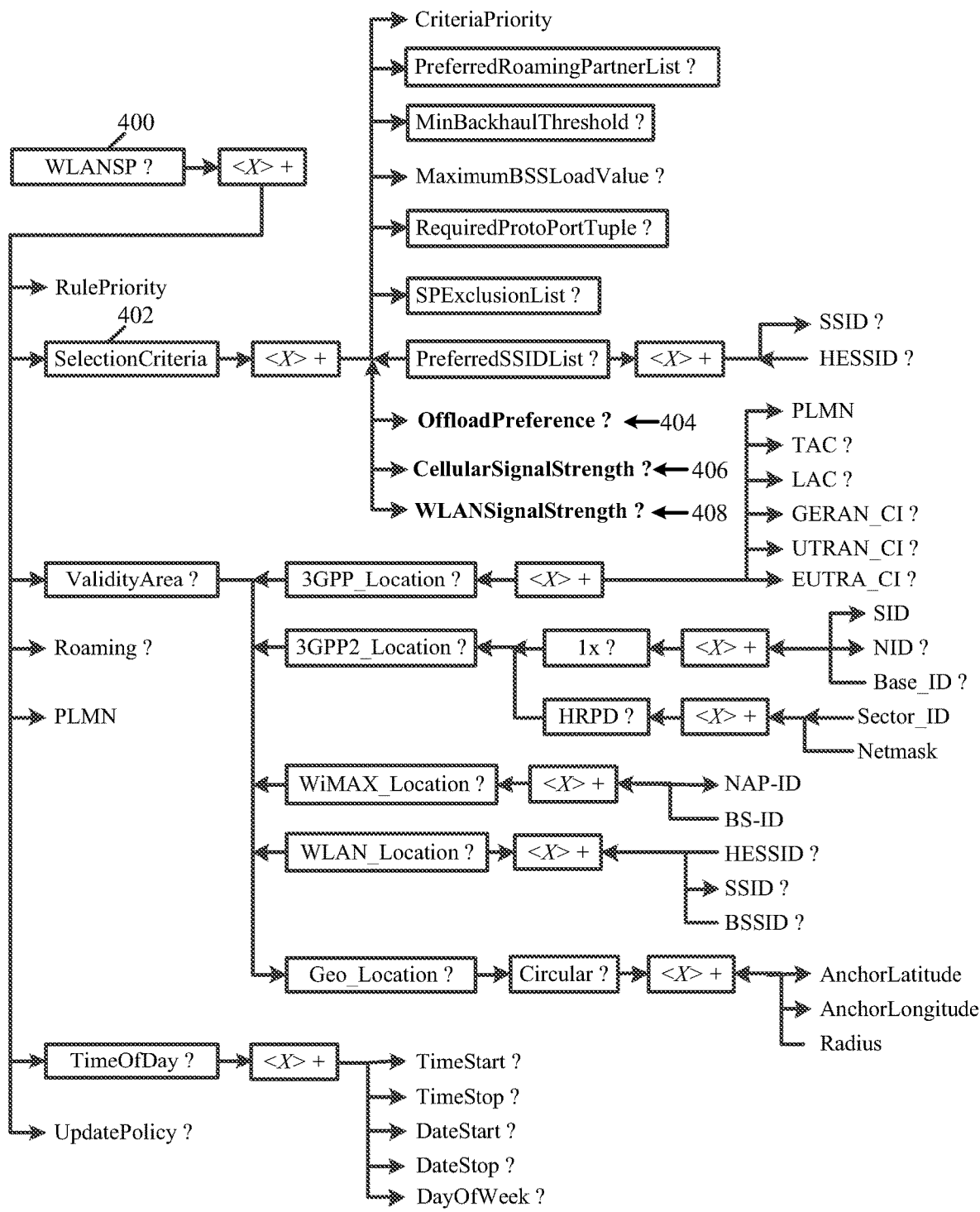
FIG. 4 is a schematic illustration of a Wireless Local Area Network (WLAN) Selection policy (WLANSP) node of an ANDSF MO, in accordance with some demonstrative embodiments.

FIG. 4 is a schematic illustration of a Wireless Local Area Network (WLAN) Selection policy (WLANSP) node 400 of an ANDSF MO, in accordance with some demonstrative embodiments. For example, ANDSF server 162 (FIG. 1) may send to UE 102 (FIG. 1) the ANDSF MO 163 (FIG. 1) including WLANSP node 400.

In some demonstrative embodiments, WLANSP node 400 may include ANDSF assistance information and/or ANDSF rules, e.g., as described below.

In some demonstrative embodiments, WLANSP node 400 may include RAN parameters, e.g., the ANDSF assistance parameters, to be provided to a UE, e.g., to UE 102 (FIG. 1). For example, WLAN SP node 400 may include the RAN parameters as part of a Selection Criteria node 402.

In some demonstrative embodiments, node 402 may include an offload preference indicator ("OffloadPreference") node 404 to indicate whether WLAN access or cellular access is preferred. For example, node 404 may include the offload preference indicator, e.g., as described above. In one example, 404 may include node 304 (FIG. 3), e.g., as described above.

In some demonstrative embodiments, node 402 may include a cellular threshold ("CellularSignalStrengh") node 406 to indicate one or more cellular thresholds. For example, node 406 may include the ANDSF cellular thresholds, e.g., as described above. In one example, node 406 may include node 306 (FIG. 3), e.g., as described above.

In some demonstrative embodiments, node 402 may include a cellular threshold ("WLANSignalStrength") node 408 to indicate one or more WLAN thresholds. For example, node 408 may include the ANDSF WLAN thresholds, e.g., as described above. In one example, node 408 may include node 308 (FIG. 3), e.g., as described above.

Figure 5:
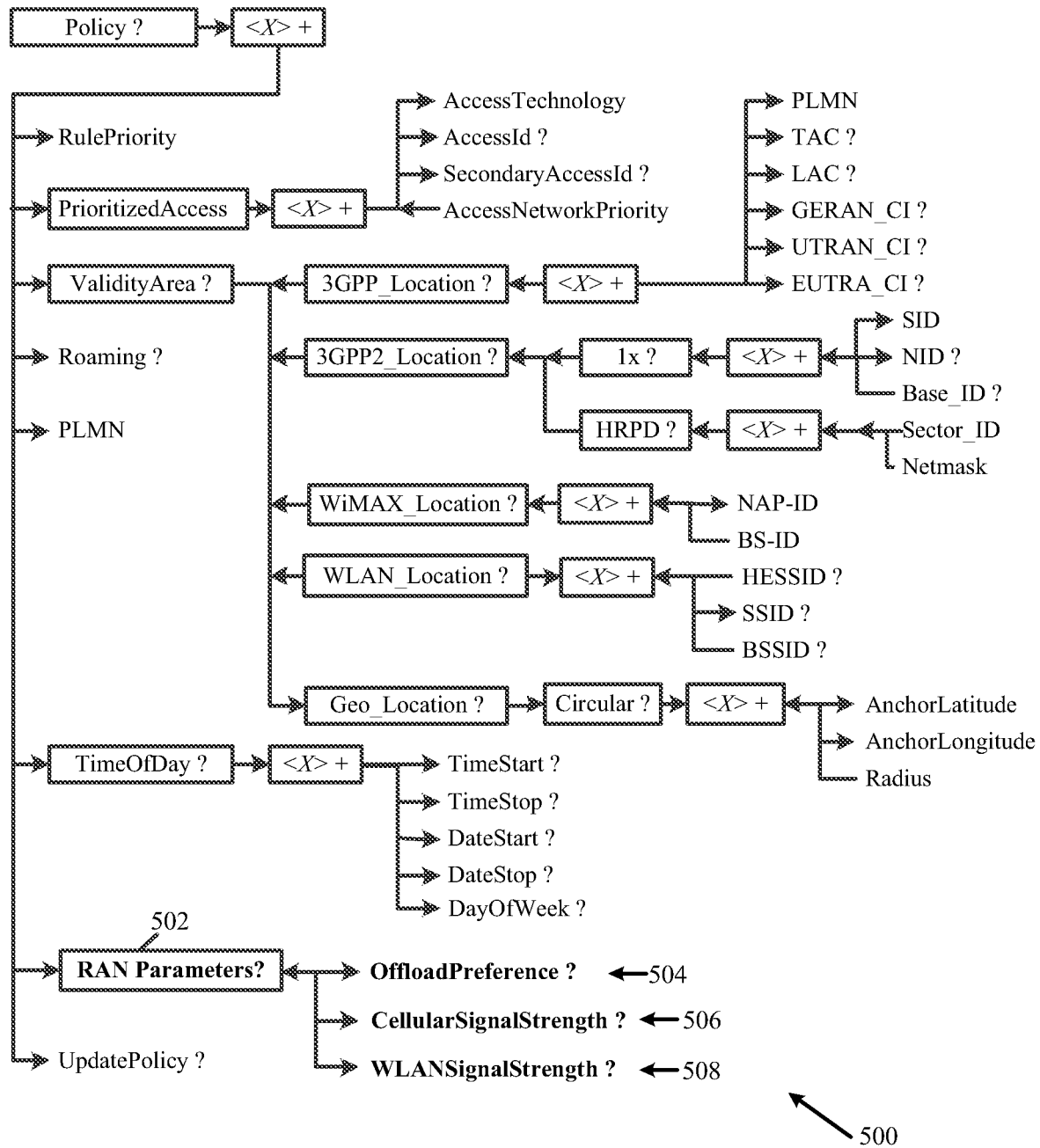
FIG. 5 is a schematic illustration of an Inter System Mobility Policy (ISMP) node of an ANDSF MO, in accordance with some demonstrative embodiments.

FIG. 5 is a schematic illustration of an Inter System Mobility Policy (ISMP) node 500 of an ANDSF MO, in accordance with some demonstrative embodiments. For example, ANDSF server 162 (FIG. 1) may send to UE 102 (FIG. 1) the ANDSF MO 163 (FIG. 1) including ISMP node 500.

In some demonstrative embodiments, ISMP node 500 may include ANDSF assistance information and/or ANDSF rules, e.g., as described below.

In some demonstrative embodiments, ISMP node 500 may include a branch ("RANParameters") 502 to include RAN parameters, e.g., the ANDSF assistance parameters, to be provided to a UE, e.g., to UE 102 (FIG. 1). For example, branch 502 may include branch 302 (FIG. 3), e.g., as described above.

In some demonstrative embodiments, branch 502 may include an offload preference indicator ("OffloadPreference") node 504 to indicate whether WLAN access or cellular access is preferred. For example, node 504 may include the offload preference indicator, e.g., as described above. In one example, 504 may include node 304 (FIG. 3), e.g., as described above.

In some demonstrative embodiments, branch 502 may include a cellular threshold ("CellularSignalStrengh") node 506 to indicate one or more cellular thresholds. For example, node 506 may include the ANDSF cellular thresholds, e.g., as described above. In one example, node 506 may include node 306 (FIG. 3), e.g., as described above.

In some demonstrative embodiments, branch 502 may include a cellular threshold ("WLANSignalStrength") node 508 to indicate one or more WLAN thresholds. For example, node 508 may include the ANDSF WLAN thresholds, e.g., as described above. In one example, node 508 may include node 308 (FIG. 3), e.g., as described above.

Figure 6:
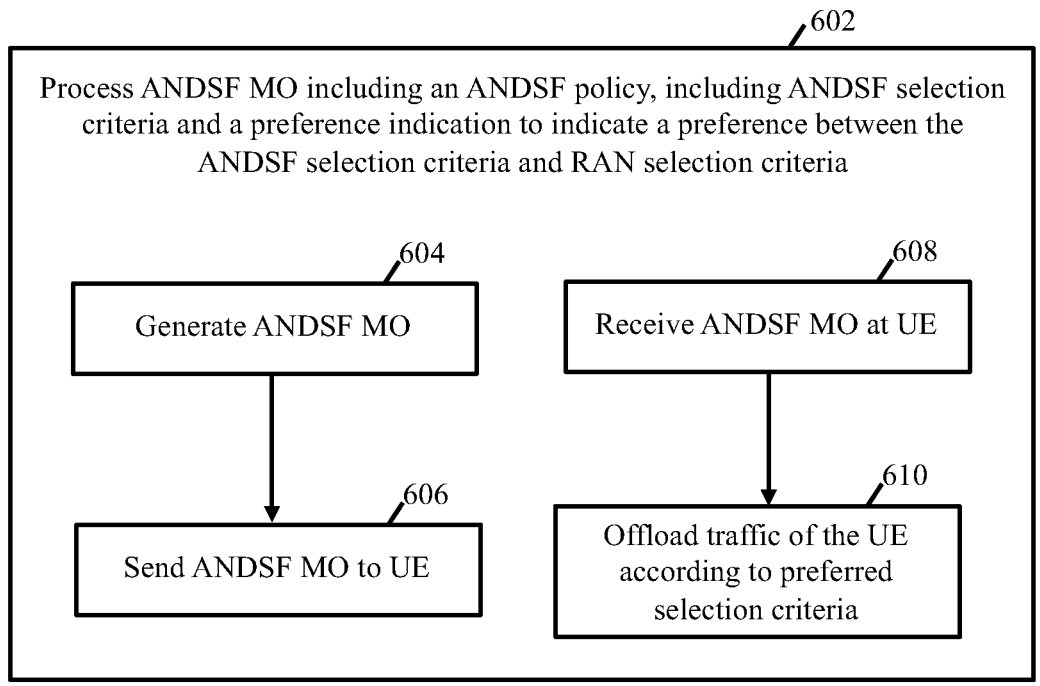
FIG. 6 is a schematic flow-chart illustration of a method of offloading traffic using an ANDSF MO, in accordance with some demonstrative embodiments.

FIG. 6 is a schematic flow-chart illustration of a method of offloading traffic using an ANDSF MO, in accordance with some demonstrative embodiments. In some embodiments, one or more of the operations of the method of FIG. 5 may be performed by a wireless communication system e.g., system 100 (FIG. 1); a UE, e.g., UE 102 (FIG. 1); an ANDSF server, e.g., ANDSF server 162 (FIG. 1); an ANDSF policy module, e.g., ANDSF policy module 168 (FIG. 1); and/or an offloading module, e.g., offloading module 145 (FIG. 1).

As indicated at block 602, the method may include processing an ANDSF MO including at least ANDSF policy, which includes ANDSF selection criteria and a preference indicator to indicate a preference between the ANDSF selection criteria and RAN selection criteria. In one example, ANDSF policy module 168 (FIG. 1) may process ANDSF MO 163 (FIG. 1), e.g., as described above. In another example, offloadability module 145 (FIG. 1) may process ANDSF MO 163 (FIG. 1) from ANDSF server 162 (FIG. 1), e.g., as described above.

In some demonstrative embodiments, the method may include generating the ANDSF MO, as indicated at block 604; and sending the ANDSF MO to a UE, as indicated at block 606. For example, ANDSF policy module 168 (FIG. 1) may determine ANDSF MO 163 (FIG. 1), and communication interface 164 (FIG. 1) may send ANDSF MO 163 to UE 102 (FIG. 1), e.g., as described above.

In some demonstrative embodiments, the method may include receiving the ANDSF MU at a UE, as indicated at block 608; and offloading traffic of the UE according to preferred selection criteria indicated by the preference indicator. For example, UE 102 (FIG. 1) may receive the ANDSF MO 163 (FIG. 1) from ANDSF server 162 (FIG. 1), and offloadability module 145 (FIG. 1) may select to offload traffic of UE 102 (FIG. 1) according to the ANDSF selection criteria or the RAN selection criteria, based on the preference indicator, e.g., as described above.

Figure 7:
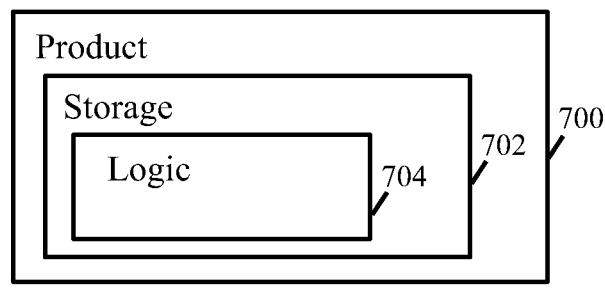
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of UE 102 (FIG. 1), eNB 104 (FIG. 1), node B 196 (FIG. 1), ANDSF server 162 (FIG. 1), offloadability module 145 (FIG. 1), and/or ANDSF policy module 168 (FIG. 1), and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a User Equipment (UE) comprising a Wireless Local Area Network (WLAN) transceiver to communicate with a WLAN; a cellular transceiver to communicate with a cellular network; and an offloading module to offload traffic of the UE between the WLAN and the cellular network, the offloading module to receive an Access Network Discovery and Selection Function (ANDSF) Management Object (MO) including a preference indicator to indicate preferred selection criteria are to be either Radio Access Network (RAN) selection criteria provided by the cellular network or ANDSF selection criteria provided by an ANDSF server, the offloading module to offload the traffic according to the preferred selection criteria.

Example 2 includes the subject matter of Example 1, and optionally, wherein the RAN selection criteria include one or more RAN WLAN thresholds, and the ANDSF selection criteria include one or more ANDSF WLAN thresholds.

Example 3 includes the subject matter of Example 2, and optionally, wherein the offloading module is to use the RAN WLAN thresholds when the preference indicator indicates the RAN selection criteria are preferred, and to use the ANDSF WLAN thresholds when the preference indicator indicates the ANDSF selection criteria are preferred.

Example 4 includes the subject matter of Example 2 or 3, and optionally, wherein the ANDSF MO includes the one or more ANDSF WLAN thresholds.

Example 5 includes the subject matter of any one of Examples 2-4, and optionally, wherein the one or more ANDSF WLAN thresholds include at least one WLAN signal strength threshold.

Example 6 includes the subject matter of any one of Examples 1-5, and optionally, wherein the ANDSF MO includes an offload preference indication indicating a preference between the cellular network and the WLAN, the offloading module to offload the traffic based on the offload preference indication.

Example 7 includes the subject matter of any one of Examples 1-6, and optionally, wherein the ANDSF MO includes one or more cellular thresholds.

Example 8 includes the subject matter of Example 7, and optionally, wherein the cellular thresholds include at least one threshold selected from the group consisting of a Reference Signal Received Power (RSRP) threshold, and a Received Signal Code Power (RSCP) threshold.

Example 9 includes the subject matter of any one of Examples 1-8, and optionally, wherein the ANDSF MO includes an Inter-System Routing Policy (ISRP).

Example 10 includes the subject matter of any one of Examples 1-9, and optionally, wherein the ANDSF MO includes a WLAN Selection Policy (WLANSP).

Example 11 includes the subject matter of any one of Examples 1-10, and optionally, comprising one or more antennas, a memory and a processor.

Example 12 includes an Access Network Discovery and Selection Function (ANDSF) server comprising an ANDSF policy module to determine an ANDSF Management Object (MO) including one or more ANDSF policies, the ANDSF MO including a preference indicator to indicate a preference between Radio Access Network (RAN) selection criteria provided by a cellular network and ANDSF selection criteria provided by the ANDSF server; and a communication interface to send the ANDSF MO to a User Equipment (UE).

Example 13 includes the subject matter of Example 12, and optionally, wherein the preference indicator is to have a first predefined value to indicate the RAN selection criteria are preferred, or a second predefined value to indicate the ANDSF selection criteria are preferred.

Example 14 includes the subject matter of Example 12 or 13, and optionally, wherein the RAN selection criteria include one or more RAN Wireless Local Area Network (WLAN) thresholds, and the ANDSF selection criteria include one or more ANDSF WLAN thresholds.

Example 15 includes the subject matter of Example 14, and optionally, wherein the one or more ANDSF policies include the one or more ANDSF WLAN thresholds.

Example 16 includes the subject matter of Example 14 or 15, and optionally, wherein the one or more ANDSF WLAN thresholds include at least one WLAN signal strength threshold.

Example 17 includes the subject matter of any one of Examples 12-16, and optionally, wherein the one or more ANDSF policies include an offload preference indication indicating a preference between the cellular network and a Wireless Local Area Network (WLAN).

Example 18 includes the subject matter of any one of Examples 12-17, and optionally, wherein the one or more ANDSF policies include one or more cellular thresholds.

Example 19 includes the subject matter of Example 18, and optionally, wherein the cellular thresholds include at least one threshold selected from the group consisting of a Reference Signal Received Power (RSRP) threshold, and a Received Signal Code Power (RSCP) threshold.

Example 20 includes the subject matter of any one of Examples 12-19, and optionally, wherein the one or more ANDSF policies include an Inter-System Routing Policy (ISRP).

Example 21 includes the subject matter of any one of Examples 12-20, and optionally, wherein the one or more ANDSF policies include a Wireless Local Area Network (WLAN) Selection Policy (WLANSP).

Example 22 includes the subject matter of any one of Examples 12-21, and optionally, comprising a memory and a processor.

Example 23 includes a method to be performed at a User Equipment (UE), the method comprising receiving an Access Network Discovery and Selection Function (ANDSF) Management Object (MO) including a preference indicator; determining preferred selection criteria by selecting, based on the preference indicator, between Radio Access Network (RAN) selection criteria provided by a cellular network or ANDSF selection criteria provided by an ANDSF server; and offloading traffic of the UE between a Wireless Local Area Network (WLAN) and the cellular network, according to the preferred selection criteria.

Example 24 includes the subject matter of Example 23, and optionally, wherein the RAN selection criteria include one or more RAN WLAN thresholds, and the ANDSF selection criteria include one or more ANDSF WLAN thresholds.

Example 25 includes the subject matter of Example 24, and optionally, comprising offloading the traffic according to the RAN WLAN thresholds when the preference indicator indicates the RAN selection criteria are preferred, and offloading the traffic according to the ANDSF WLAN thresholds when the preference indicator indicates the ANDSF selection criteria are preferred.

Example 26 includes the subject matter of Example 24 or 25, and optionally, wherein the ANDSF MO includes the one or more ANDSF WLAN thresholds.

Example 27 includes the subject matter of any one of Examples 24-26, and optionally, wherein the one or more ANDSF WLAN thresholds include at least one WLAN signal strength threshold.

Example 28 includes the subject matter of any one of Examples 23-27, and optionally, wherein the ANDSF MO includes an offload preference indication indicating a preference between the cellular network and the WLAN, wherein offloading the traffic comprises offloading the traffic based on the offload preference indication.

Example 29 includes the subject matter of any one of Examples 23-28, and optionally, wherein the ANDSF MO includes one or more cellular thresholds.

Example 30 includes the subject matter of Example 29, and optionally, wherein the cellular thresholds include at least one threshold selected from the group consisting of a Reference Signal Received Power (RSRP) threshold, and a Received Signal Code Power (RSCP) threshold.

Example 31 includes the subject matter of any one of Examples 23-30, and optionally, wherein the ANDSF MO includes an Inter-System Routing Policy (ISRP).

Example 32 includes the subject matter of any one of Examples 23-31, and optionally, wherein the ANDSF MO includes a WLAN Selection Policy (WLANSP).

Example 33 includes a product including one or more tangible computer-readable non-transitory storage media comprising computer-executable instructions operable to, when executed by at least one computer processor, enable the at least one computer processor to implement a method at a User Equipment (UE), the method comprising receiving an Access Network Discovery and Selection Function (ANDSF) Management Object (MO) including a preference indicator; determining preferred selection criteria by selecting, based on the preference indicator, between Radio Access Network (RAN) selection criteria provided by a cellular network or ANDSF selection criteria provided by an ANDSF server; and offloading traffic of the UE between a Wireless Local Area Network (WLAN) and the cellular network, according to the preferred selection criteria.

Example 34 includes the subject matter of Example 33, and optionally, wherein the RAN selection criteria include one or more RAN WLAN thresholds, and the ANDSF selection criteria include one or more ANDSF WLAN thresholds.

Example 35 includes the subject matter of Example 34, and optionally, wherein the method comprises offloading the traffic according to the RAN WLAN thresholds when the preference indicator indicates the RAN selection criteria are preferred, and offloading the traffic according to the ANDSF WLAN thresholds when the preference indicator indicates the ANDSF selection criteria are preferred.

Example 36 includes the subject matter of Example 34 or 35, and optionally, wherein the ANDSF MO includes the one or more ANDSF WLAN thresholds.

Example 37 includes the subject matter of any one of Examples 34-36, and optionally, wherein the one or more ANDSF WLAN thresholds include at least one WLAN signal strength threshold.

Example 38 includes the subject matter of any one of Examples 33-37, and optionally, wherein the ANDSF MO includes an offload preference indication indicating a preference between the cellular network and the WLAN, wherein offloading the traffic comprises offloading the traffic based on the offload preference indication.

Example 39 includes the subject matter of any one of Examples 33-38, and optionally, wherein the ANDSF MO includes one or more cellular thresholds.

Example 40 includes the subject matter of Example 39, and optionally, wherein the cellular thresholds include at least one threshold selected from the group consisting of a Reference Signal Received Power (RSRP) threshold, and a Received Signal Code Power (RSCP) threshold.

Example 41 includes the subject matter of any one of Examples 33-40, and optionally, wherein the ANDSF MO includes an Inter-System Routing Policy (ISRP).

Example 42 includes the subject matter of any one of Examples 33-41, and optionally, wherein the ANDSF MO includes a WLAN Selection Policy (WLANSP).

Example 43 includes a User Equipment (UE) comprising means for receiving an Access Network Discovery and Selection Function (ANDSF) Management Object (MO) including a preference indicator; means for determining preferred selection criteria by selecting, based on the preference indicator, between Radio Access Network (RAN) selection criteria provided by a cellular network or ANDSF selection criteria provided by an ANDSF server; and means for offloading traffic of the UE between a Wireless Local Area Network (WLAN) and the cellular network, according to the preferred selection criteria.

Example 44 includes the subject matter of Example 43, and optionally, wherein the RAN selection criteria include one or more RAN WLAN thresholds, and the ANDSF selection criteria include one or more ANDSF WLAN thresholds.

Example 45 includes the subject matter of Example 44, and optionally, comprising means for offloading the traffic according to the RAN WLAN thresholds when the preference indicator indicates the RAN selection criteria are preferred, and offloading the traffic according to the ANDSF WLAN thresholds when the preference indicator indicates the ANDSF selection criteria are preferred.

Example 46 includes the subject matter of Example 44 or 45, and optionally, wherein the ANDSF MO includes the one or more ANDSF WLAN thresholds.

Example 47 includes the subject matter of any one of Examples 44-46, and optionally, wherein the one or more ANDSF WLAN thresholds include at least one WLAN signal strength threshold.

Example 48 includes the subject matter of any one of Examples 43-47, and optionally, wherein the ANDSF MO includes an offload preference indication indicating a preference between the cellular network and the WLAN, wherein offloading the traffic comprises offloading the traffic based on the offload preference indication.

Example 49 includes the subject matter of any one of Examples 43-48, and optionally, wherein the ANDSF MO includes one or more cellular thresholds.

Example 50 includes the subject matter of Example 49, and optionally, wherein the cellular thresholds include at least one threshold selected from the group consisting of a Reference Signal Received Power (RSRP) threshold, and a Received Signal Code Power (RSCP) threshold.

Example 51 includes the subject matter of any one of Examples 43-50, and optionally, wherein the ANDSF MO includes an Inter-System Routing Policy (ISRP).

Example 52 includes the subject matter of any one of Examples 43-51, and optionally, wherein the ANDSF MO includes a WLAN Selection Policy (WLANSP).

Example 53 includes a method to be performed at an Access Network Discovery and Selection Function (ANDSF) server, the method comprising determining an ANDSF Management Object (MO) including one or more ANDSF policies, the ANDSF MO including a preference indicator to indicate a preference between Radio Access Network (RAN) selection criteria provided by a cellular network and ANDSF selection criteria provided by the ANDSF server; and sending the ANDSF MO to a User Equipment (UE).

Example 54 includes the subject matter of Example 53, and optionally, wherein the preference indicator is to have a first predefined value to indicate the RAN selection criteria are preferred, or a second predefined value to indicate the ANDSF selection criteria are preferred.

Example 55 includes the subject matter of Example 53 or 54, and optionally, wherein the RAN selection criteria include one or more RAN Wireless Local Area Network (WLAN) thresholds, and the ANDSF selection criteria include one or more ANDSF WLAN thresholds.

Example 56 includes the subject matter of Example 55, and optionally, wherein the one or more ANDSF policies include the one or more ANDSF WLAN thresholds.

Example 57 includes the subject matter of Example 55 or 56, and optionally, wherein the one or more ANDSF WLAN thresholds include at least one WLAN signal strength threshold.

Example 58 includes the subject matter of any one of Examples 53-57, and optionally, wherein the one or more ANDSF policies include an offload preference indication indicating a preference between the cellular network and a Wireless Local Area Network (WLAN).

Example 59 includes the subject matter of any one of Examples 53-58, and optionally, wherein the one or more ANDSF policies include one or more cellular thresholds.

Example 60 includes the subject matter of Example 59, and optionally, wherein the cellular thresholds include at least one threshold selected from the group consisting of a Reference Signal Received Power (RSRP) threshold, and a Received Signal Code Power (RSCP) threshold.

Example 61 includes the subject matter of any one of Examples 53-60, and optionally, wherein the one or more ANDSF policies include an Inter-System Routing Policy (ISRP).

Example 62 includes the subject matter of any one of Examples 53-61, and optionally, wherein the one or more ANDSF policies include a Wireless Local Area Network (WLAN) Selection Policy (WLANSP).

Example 63 includes a product including one or more tangible computer-readable non-transitory storage media comprising computer-executable instructions operable to, when executed by at least one computer processor, enable the at least one computer processor to implement a method at an Access Network Discovery and Selection Function (ANDSF) server, the method comprising determining an ANDSF Management Object (MO) including one or more ANDSF policies, the ANDSF MO including a preference indicator to indicate a preference between Radio Access Network (RAN) selection criteria provided by a cellular network and ANDSF selection criteria provided by the ANDSF server; and sending the ANDSF MO to a User Equipment (UE).

Example 64 includes the subject matter of Example 63, and optionally, wherein the preference indicator is to have a first predefined value to indicate the RAN selection criteria are preferred, or a second predefined value to indicate the ANDSF selection criteria are preferred.

Example 65 includes the subject matter of Example 63 or 64, and optionally, wherein the RAN selection criteria include one or more RAN Wireless Local Area Network (WLAN) thresholds, and the ANDSF selection criteria include one or more ANDSF WLAN thresholds.

Example 66 includes the subject matter of Example 65, and optionally, wherein the one or more ANDSF policies include the one or more ANDSF WLAN thresholds.

Example 67 includes the subject matter of Example 65 or 66, and optionally, wherein the one or more ANDSF WLAN thresholds include at least one WLAN signal strength threshold.

Example 68 includes the subject matter of any one of Examples 63-67, and optionally, wherein the one or more ANDSF policies include an offload preference indication indicating a preference between the cellular network and a Wireless Local Area Network (WLAN).

Example 69 includes the subject matter of any one of Examples 63-68, and optionally, wherein the one or more ANDSF policies include one or more cellular thresholds.

Example 70 includes the subject matter of Example 69, and optionally, wherein the cellular thresholds include at least one threshold selected from the group consisting of a Reference Signal Received Power (RSRP) threshold, and a Received Signal Code Power (RSCP) threshold.

Example 71 includes the subject matter of any one of Examples 63-70, and optionally, wherein the one or more ANDSF policies include an Inter-System Routing Policy (ISRP).

Example 72 includes the subject matter of any one of Examples 63-71, and optionally, wherein the one or more ANDSF policies include a Wireless Local Area Network (WLAN) Selection Policy (WLANSP).

Example 73 includes an Access Network Discovery and Selection Function (ANDSF) server comprising means for determining an ANDSF Management Object (MO) including one or more ANDSF policies, the ANDSF MO including a preference indicator to indicate a preference between Radio Access Network (RAN) selection criteria provided by a cellular network and ANDSF selection criteria provided by the ANDSF server; and means for sending the ANDSF MO to a User Equipment (UE).

Example 74 includes the subject matter of Example 73, and optionally, wherein the preference indicator is to have a first predefined value to indicate the RAN selection criteria are preferred, or a second predefined value to indicate the ANDSF selection criteria are preferred.

Example 75 includes the subject matter of Example 73 or 74, and optionally, wherein the RAN selection criteria include one or more RAN Wireless Local Area Network (WLAN) thresholds, and the ANDSF selection criteria include one or more ANDSF WLAN thresholds.

Example 76 includes the subject matter of Example 75, and optionally, wherein the one or more ANDSF policies include the one or more ANDSF WLAN thresholds.

Example 77 includes the subject matter of Example 75 or 76, and optionally, wherein the one or more ANDSF WLAN thresholds include at least one WLAN signal strength threshold.

Example 78 includes the subject matter of any one of Examples 73-77, and optionally, wherein the one or more ANDSF policies include an offload preference indication indicating a preference between the cellular network and a Wireless Local Area Network (WLAN).

Example 79 includes the subject matter of any one of Examples 73-78, and optionally, wherein the one or more ANDSF policies include one or more cellular thresholds.

Example 80 includes the subject matter of Example 79, and optionally, wherein the cellular thresholds include at least one threshold selected from the group consisting of a Reference Signal Received Power (RSRP) threshold, and a Received Signal Code Power (RSCP) threshold.

Example 81 includes the subject matter of any one of Examples 73-80, and optionally, wherein the one or more ANDSF policies include an Inter-System Routing Policy (ISRP).

Example 82 includes the subject matter of any one of Examples 73-81, and optionally, wherein the one or more ANDSF policies include a Wireless Local Area Network (WLAN) Selection Policy (WLANSP).

Example 83 includes a product including one or more tangible computer-readable non-transitory storage media comprising computer-executable instructions operable to, when executed by at least one computer processor, enable the at least one computer processor to implement a method comprising processing a Selection Function (ANDSF) Management Object (MO), the ANDSF MO including one or more ANDSF policies, at least one ANDSF policy including ANDSF selection criteria to offload traffic between a cellular network and a Wireless Local Area Network (WLAN); and a preference indicator to indicate a preference between the ANDSF selection criteria and Radio Access Network (RAN) selection criteria from the cellular network.

Example 84 includes the subject matter of Example 83, and optionally, wherein the method comprises determining the ANDSF MO, and sending the ANDSF MO to a User Equipment (UE).

Example 85 includes the subject matter of Example 83, and optionally, wherein the method comprises receiving the ANDSF MO at a User Equipment (UE), and offloading traffic of the UE using preferred selection criteria according to the preference indicator.

Example 86 includes the subject matter of any one of Examples 83-85, and optionally, wherein the preference indicator is to have a first predefined value to indicate the RAN selection criteria are preferred, or a second predefined value to indicate the ANDSF selection criteria are preferred.

Example 87 includes the subject matter of any one of Examples 83-86, and optionally, wherein the RAN selection criteria include one or more RAN Wireless Local Area Network (WLAN) thresholds, and the ANDSF selection criteria include one or more ANDSF WLAN thresholds.

Example 88 includes the subject matter of Example 87, and optionally, wherein the one or more ANDSF policies include the one or more ANDSF WLAN thresholds.

Example 89 includes the subject matter of Example 87 or 88, and optionally, wherein the one or more ANDSF WLAN thresholds include at least one WLAN signal strength threshold.

Example 90 includes the subject matter of any one of Examples 83-89, and optionally, wherein the one or more ANDSF policies include an offload preference indication indicating a preference between the cellular network and a Wireless Local Area Network (WLAN).

Example 91 includes the subject matter of any one of Examples 83-90, and optionally, wherein the one or more ANDSF policies include one or more cellular thresholds.

Example 92 includes the subject matter of Example 91, and optionally, wherein the cellular thresholds include at least one threshold selected from the group consisting of a Reference Signal Received Power (RSRP) threshold, and a Received Signal Code Power (RSCP) threshold.

Example 93 includes the subject matter of any one of Examples 83-92, and optionally, wherein the one or more ANDSF policies include an Inter-System Routing Policy (ISRP).

Example 94 includes the subject matter of any one of Examples 83-93, and optionally, wherein the one or more ANDSF policies include a Wireless Local Area Network (WLAN) Selection Policy (WLANSP).

Example 95 includes an apparatus comprising means for processing a Selection Function (ANDSF) Management Object (MO), the ANDSF MO including one or more ANDSF policies, at least one ANDSF policy including ANDSF selection criteria to offload traffic between a cellular network and a Wireless Local Area Network (WLAN); and a preference indicator to indicate a preference between the ANDSF selection criteria and Radio Access Network (RAN) selection criteria from the cellular network.

Example 96 includes the subject matter of Example 95, and optionally, comprising means for determining the ANDSF MO, and sending the ANDSF MO to a User Equipment (UE).

Example 97 includes the subject matter of Example 95, and optionally, comprising means for receiving the ANDSF MO at a User Equipment (UE), and offloading traffic of the UE using preferred selection criteria according to the preference indicator.

Example 98 includes the subject matter of any one of Examples 95-97, and optionally, wherein the preference indicator is to have a first predefined value to indicate the RAN selection criteria are preferred, or a second predefined value to indicate the ANDSF selection criteria are preferred.

Example 99 includes the subject matter of any one of Examples 95-98, and optionally, wherein the RAN selection criteria include one or more RAN Wireless Local Area Network (WLAN) thresholds, and the ANDSF selection criteria include one or more ANDSF WLAN thresholds.

Example 100 includes the subject matter of Example 99, and optionally, wherein the one or more ANDSF policies include the one or more ANDSF WLAN thresholds.

Example 101 includes the subject matter of Example 99 or 100, and optionally, wherein the one or more ANDSF WLAN thresholds include at least one WLAN signal strength threshold.

Example 102 includes the subject matter of any one of Examples 95-101, and optionally, wherein the one or more ANDSF policies include an offload preference indication indicating a preference between the cellular network and a Wireless Local Area Network (WLAN).

Example 103 includes the subject matter of any one of Examples 95-102, and optionally, wherein the one or more ANDSF policies include one or more cellular thresholds.

Example 104 includes the subject matter of Example 103, and optionally, wherein the cellular thresholds include at least one threshold selected from the group consisting of a Reference Signal Received Power (RSRP) threshold, and a Received Signal Code Power (RSCP) threshold.

Example 105 includes the subject matter of any one of Examples 95-104, and optionally, wherein the one or more ANDSF policies include an Inter-System Routing Policy (ISRP).

Example 106 includes the subject matter of any one of Examples 95-105, and optionally, wherein the one or more ANDSF policies include a Wireless Local Area Network (WLAN) Selection Policy (WLANSP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory and a processor configured to cause a user equipment (UE) to:
    receive an Access Network Discovery and Selection Function (ANDSF) management object (MO) from an ANDSF server via a base station, the ANDSF MO is to comprise an ANDSF rule and a provisioned offload preference indicator (OPI) which is operator specific and is to indicate a preference between an Evolved Universal Terrestrial Radio Access Network (E-UTRAN)/UTRAN access and a Wireless Local Area Network (WLAN) access; and
    route a traffic flow between the E-UTRAN/UTRAN and the WLAN, at least in part based on the ANDSF rule and the OPI, wherein the ANDSF MO is to comprise a Radio Access Network (RAN) parameter which is supported by the E-UTRAN/UTRAN, wherein the RAN parameter is to comprise a WLAN threshold, and wherein routing of the traffic flow is through comparing a measured WLAN result with the WLAN threshold in the ANDSF MO.

2. The apparatus of claim 1, wherein the ANDSF rule is to comprise at least one of an inter-system routing policy (ISRP), an inter system mobility policy (ISMP), or a WLAN selection policy (WLANSP).

3. The apparatus of claim 2 configured to cause the UE to use the ISRP to route the traffic flow, when the UE is capable to simultaneously route the traffic flow to both the EUTRAN/UTRAN and the WLAN.

4. The apparatus of claim 2 configured to cause the UE to use the ISMP to route the traffic flow, when the UE is not capable to simultaneously route the traffic flow to both EUTRAN/UTRAN and the WLAN.

5. The apparatus of claim 1, wherein the ANDSF MO is to comprise a preference indicator to indicate preferred selection criteria are to be either Radio Access Network
    (RAN) selection criteria provided by a cellular network or ANDSF selection criteria provided by the ANDSF server.

6. The apparatus of claim 1 configured to cause the UE to select between using the ANDSF rule and a Radio Access Network (RAN) rule to determine on routing the traffic flow.

7. The apparatus of claim 1 comprising a transceiver and one or more antennas.

8. An apparatus comprising a memory and a processor configured to cause an Access Network Discovery and Selection Function (ANDSF) server in a wireless network to:
    generate an ANDSF management object (MO), the ANDSF MO is to comprise an ANDSF rule and a provisioned offload preference indicator (OPI) which is operator specific and is to indicate a preference between an Evolved Universal Terrestrial Radio Access Network
    (EUTRAN)/UTRAN access and a Wireless Local Area Network (WLAN) access, wherein the ANDSF MO is to comprise a Radio Access Network (RAN) parameter which is supported by the E-UTRAN/UTRAN, wherein the RAN parameter is to comprise a WLAN threshold configured for routing a traffic flow through comparison of a measured WLAN result with the WLAN threshold; and
    transmit the ADNSF MO to a User Equipment (UE) via a base station.

9. The apparatus of claim 8, wherein the AND SF rule is to comprise an intersystem routing policy (ISRP), when the UE is capable to simultaneously route a traffic flow to both the E-UTRAN/UTRAN and the WLAN.

10. The apparatus of claim 8, wherein the ANDSF rule is to comprise an inter system mobility policy (ISMP), when the UE is not capable to simultaneously route a traffic flow to both the E-UTRAN/UTRAN and the WLAN.

11. The apparatus of claim 8, wherein the ANDSF rule is to comprise a WLAN selection policy (WLANSP).

12. The apparatus of claim 8, wherein the ANDSF MO is to comprise a preference indicator to indicate preferred selection criteria are to be either Radio Access Network
    (RAN) selection criteria provided by a cellular network or ANDSF selection criteria provided by the ANDSF server.

13. The apparatus of claim 8 comprising a communication interface to transmit the ANDSF MO.

14. A product comprising a non-transitory computer readable storage medium encoded with executable instructions, which when executed by at least one processor, cause a user equipment (UE) to:
    receive an Access Network Discovery and Selection Function (ANDSF) management object (MO) from an ANDSF server via a base station, the ANDSF MO is to comprise an ANDSF rule and a provisioned offload preference indicator (OPI) which is operator specific and is to indicate a preference between an Evolved Universal Terrestrial Radio Access Network (E-UTRAN)/UTRAN access and a Wireless Local Area Network (WLAN) access; and route a traffic flow between the E-UTRAN/UTRAN and the WLAN, at least in part based on the ANDSF rule and the OPI, wherein the ANDSF MO is to comprise a Radio Access Network (RAN) parameter which is supported by the E-UTRAN/UTRAN, wherein the RAN parameter is to comprise a WLAN threshold, and wherein routing of the traffic flow is through comparing a measured WLAN result with the WLAN threshold in the ANDSF MO.

15. The product of claim 14, wherein the ANDSF rule is to comprise at least one of an inter-system routing policy (ISRP), an inter system mobility policy (ISMP), or a WLAN selection policy (WLANSP).

16. The product of claim 15, wherein the instructions, when executed, cause the UE to use the ISRP to route the traffic flow, when the UE is capable to simultaneously route the traffic flow to both the E-UTRAN/UTRAN and the WLAN.

17. The product of claim 15, wherein the instructions, when executed, cause the UE to use the ISMP to route the traffic flow, when the UE is not capable to simultaneously route the traffic flow to both E-UTRAN/UTRAN and the WLAN.

18. The product of claim 14, wherein the ANDSF MO is to comprise a preference indicator to indicate preferred selection criteria are to be either Radio Access Network (RAN) selection criteria provided by a cellular network or ANDSF selection criteria provided by the ANDSF server.

19. The product of claim 14, wherein the instructions, when executed, cause the UE to select between using the ANDSF rule and a Radio Access Network (RAN) rule to determine on routing the traffic flow.

20. The apparatus of claim 1, wherein the WLAN thresholds comprises a WLAN signal strength threshold.

21. The apparatus of claim 5, wherein the AND SF selection criteria comprises one or more ANDSF WLAN thresholds.

22. The apparatus of claim 8, wherein the WLAN threshold comprises a WLAN signal strength threshold.

23. The apparatus of claim 12, wherein the ANDSF selection criteria comprises one or more AND SF WLAN thresholds.

24. The product of claim 14, wherein the WLAN threshold comprises a WLAN signal strength threshold.

25. The product of claim 18, wherein the AND SF selection criteria comprises one or more ANDSF WLAN thresholds.

\* \* \* \* \*